Patented Apr. 24, 1951

2,550,490

UNITED STATES PATENT OFFICE 2,550,490

COMPLEX ALKALI METAL-ALUMINUM AND ALKALI METAL-IRON ACID PHOSPHATES

Guy A. McDonald, Chicago Heights, Ill., assignor to Victor Chemical Works, a corporation of Illinois No Drawing. Application October 29, 1945, Serial No. 625,442

7 Claims. (Cl. 23—105)

This invention relates to a baking acid composition and more particularly to a complex alkali metal-aluminum or iron acid phosphate.

Certain alkali metal-aluminum compounds have heretofore been suggested and employed as baking acids, but prior to the present invention they have had the unfortunate property of producing a bitter taste. The present compound, on the other hand, produces tasteless products upon reaction with sodium bicarbonate.

Furthermore, as will be shown in detail, the new material produces carbon dioxide slowly by the reaction and has a high capacity for producing carbon dioxide. Products, such as biscuits, resulting from the use of this baking acid are, therefore, light and large in volume.

The new complex has the formula:

$$MM'_3H_{14}(PO_4)_8 \cdot 4H_2O$$

wherein M is an alkali metal including the ammonium radical, and M' is a trivalent metal of the class consisting of aluminum and iron.

In general, the new compounds may be prepared by reacting a reactive trivalent iron or aluminum compound such as the metal itself or its hydroxide, etc., with an excess of concentrated phosphoric acid, adding sufficient alkali metal hydroxide or carbonate to give a ratio of one atom of alkali metal to three atoms of iron or aluminum, heating the solution and boiling to concentrate it sufficiently to cause crystallization, and then cooling. The crystalline product is filtered off and washed with methanol to remove the excess phosphoric acid. The product is in the form of colorless or slightly colored plate-like hexagonal crystals having the general formula:

$$MM'_3H_{14}(PO_4)_8 \cdot 3 \text{ or } 4H_2O$$

where M represents an alkali metal or ammonium radical, and M' represents a trivalent iron or aluminum atom.

The following example illustrates the exact procedure followed in producing the sodium aluminum acid phosphate compound.

108 grams of soda ash was slowly added to 3376 grams of 75% phosphoric acid at 70° C. The solution was heated to 90° C., and 458 grams of aluminum hydrate added at such rate that the charge did not boil over. The solution was boiled down, with agitation, until the boiling point reached about 135° C. The charge became thick with crystals and was cooled to room temperature while continuing the agitation. The charge was then diluted with about two volumes of a 75% methanol-25% water (by volume) solution and filtered. The crystals were washed with a 75% methanol-water solution and finally with methanol to remove any free phosphoric acid. After drying at 70° C. the product weighed 1400 grams. Analysis of the crystals showed them to correspond to the formula:

$$NaAl_3H_{14}(PO_4)_8 \cdot 4H_2O$$

Following a similar procedure by substituting iron for aluminum and by using different alkali metal and ammonium reactants, a number of complex compounds were produced. The following table shows some of these compounds and their crystal characteristics:

| Compound | Type Crystals | Axis | Refractive Indices |
|---|---|---|---|
| $NaAl_3H_{14}(PO_4)_8 \cdot 4H_2O$ | Hexagonal Plates | Biaxial (—) | $N_g=1.532$<br>$N_m=1.526$<br>$N_p=1.508$ |
| $KFe_3H_{14}(PO_4)_8 \cdot 4H_2O$ | do | do | $N_g=1.604$<br>$N_m=1.600$<br>$N_p=1.564$ |
| $KAl_3H_{14}(PO_4)_8 \cdot 4H_2O$ | do | do | $N_g=1.532$<br>$N_m=1.530$<br>$N_p=1.504$ |
| $(NH_4)Al_3H_{14}(PO_4)_8 \cdot 4H_2O$ | do | do | $N_g=1.538$<br>$N_m=1.532$<br>$N_p=1.504$ |
| $NaFe_3H_{14}(PO_4)_8 \cdot 4H_2O$ | do | do | $N_g=1.604$<br>$N_m=1.600$<br>$N_p=1.564$ |
| $NH_4Fe_3H_{14}(PO_4)_8 \cdot 4H_2O$ | do | do | $N_g=1.610$<br>$N_m=1.604$<br>$N_p=1.564$ |

The crystalline compounds illustrated above are non-hygroscopic and are highly stable under normal atmospheric conditions. The compounds are slowly soluble in water and slowly hydrolyze under such conditions to give highly acidic solutions. This characteristic of the compounds makes them especially suitable for use as baking acids in baking powders, self-rising flours, and other baking preparations.

Baking tests show that the acidic hydrogen atoms of the molecule react with sodium bicarbonate in baking preparations, liberating a large amount of carbon dioxide gas for leavening purposes substantially in accord with the following equation:

$$2NaAl_3H_{14}(PO_4)_8 \cdot 4H_2O + 23NaHCO_3 \rightarrow$$
$$Na_5Al_6(PO_4)_6(OH)_5 \cdot 12H_2O +$$
$$10Na_2HPO_4 + 14H_2O + 23CO_2$$

The principal residual salt of the leavening reaction designated in the above equation by empirical formula is a complex insoluble basic phosphate, the structure of which has not been definitely established. The salt, however, is inert and does not give the baked product a bitter taste such as is normally obtained when employing commercial phosphate-alum type leavening agents.

The reaction characteristics of the new compounds in baking procedures are similar to those of the well known sodium aluminum sulfate baking acid in that they react with sodium bicarbonate slowly in dough mixtures at ordinary temperatures, retaining a large measure of leavening action for expansion of the dough at oven temperatures. For example, doughnut dough mixtures containing sufficient sodium bicarbonate and baking acid to give 200 cc. of carbon dioxide gas were mixed at 27° C., in aqueous medium, and the liberated gas measured at the end of 2 and 15 minute periods. The results of these tests are given in the following table for the aluminum compounds:

| Baking Acid | Neutralizing Value | Reaction Rates | |
| --- | --- | --- | --- |
| | | 2 Min. | 15 Min. |
| | | cc. | cc. |
| $KAl_3H_{14}(PO_4)_8 \cdot 4H_2O$ | 100.4 | 35.0 | 51.5 |
| $NaAl_3H_{14}(PO_4)_8 \cdot 4H_2O$ | 102.0 | 41.6 | 58.6 |
| $NH_4Al_3H_{14}(PO_4)_8 \cdot 4H_2O$ | 108.0 | 31.8 | 44.4 |

From the table it will be observed that approximately 22 to 30% of the theoretical amount of leavening gas is liberated in the dough stage over a 15 minute period at room temperature of 27° C. The column headed "Neutralizing value" represents the amount of sodium bicarbonate required by weight to neutralize the acidity of 100 parts by weight of the baking acid.

The following table shows two self-rising flour formulas made up with two of the new baking acids, and for comparison a formula using ordinary monocalcium phosphate as the baking acid.

| | (A) Ordinary Monocalcium Phosphate | (B) Sodium Aluminum Phosphate | (C) Potassium Iron Phosphate |
| --- | --- | --- | --- |
| Sodium bicarbonate | 1.50 | 1.50 | 1.50 |
| Baking acid | 1.875 | 1.47 | 1.50 |
| Salt | 2.00 | 2.00 | 2.00 |
| Flour | 100.00 | 100.00 | 100.00 |

The proportions of sodium bicarbonate and baking acids were based on neutralizing values of 80 for (A), 102 for (B), and 100 for (C).

Biscuit bakes were made from doughs made with the above flours, using 12.0 parts of shortening and 66.2 parts of water based on 100 parts of flour. The following table shows the results of the bakes.

| | (A) | (B) | (C) |
| --- | --- | --- | --- |
| Specific volume of biscuit | 2.20 | 3.08 | 2.71 |
| pH Value of crumb | 7.19 | 7.62 | 7.75 |
| Height of 6 biscuits (inches) | 6⅞ | 10¼ | 9⅛ |

The doughs for the above biscuits were mixed for 15 seconds in a "Hobart" dough mixer, rolled out to ⅜" thickness, folded double, rolled out, folded double at right angles to the first folding, rolled out to original thickness, and circular doughs cut therefrom. They were baked for 15 minutes at 450° F.

The new compounds may be suitably used in preparing baking powders by admixing sodium bicarbonate and starch with the new baking acids in proportions to give the desired available $CO_2$ content.

The new product is entirely compatible with monocalcium phosphate, and may be used in combination with such baking acid to give a range of baking characteristics from the slow action of the new compounds to the fast action of the hydrated monocalcium phosphate. For example, a baking powder consisting of 28% granular sodium bicarbonate, 13% hydrated monocalcium phosphate, 20% sodium aluminum acid phosphate ($NaAl_3H_{14}(PO_4)_8 \cdot 4H_2O$), and 39% corn starch is highly stable, and represents an excellent formula for a commercial type baking powder.

For some purposes, it may be desirable to accelerate the speed of reaction of the new complex. In such cases, an accelerator may be added. The preferred accelerator is ordinary monocalcium phosphate. The monocalcium phosphate may be formed on the crystals of the complex by the process hereinafter described. In so doing, the process of preparing the baking acid composition may be modified with economic advantage by preparing the new compounds as described above up to the step of removing the excess acid with an organic solvent. At this stage instead of removing the excess phosphoric acid, it may be neutralized with hydrated lime to substantially convert the excess acid into monocalcium phosphate, thus yielding a homogeneous mixture of the baking acids in proportions controlled by the amount of excess acid employed in the first steps of the process. An example of this procedure is as follows:

1440 grams of 56.0° Bé. phosphoric acid was diluted with an equal volume of water and heated to 80° C. 145 grams of metallic aluminum was slowly added and after the reaction subsided, the mixture was heated at 90–100° C. for several hours. The impurities and excess aluminum were filtered off, and 475 grams of 56.0° Bé. phosphoric acid and 77 grams of sodium carbonate were added. The solution was concentrated by boiling until it was thick with crystals of the complex sodium aluminum acid phosphate, and the boiling point had reached 122° C. The mixture was then poured into a mixer containing 200 grams of hydrated lime. Vigorous agitation was continued until the mixture solidified into small granular lumps. It was then dried for 18 hours at about 95° C. and milled. The product was a dry, non-hygroscopic powder having a neutralizing value of 100.4. It was tested in the baking of biscuits and found to have baking characteristics equal to that of standard commercial phosphate-alum baking powders, except that it possessed the distinct advantage over the phosphate-alum baking powder of not producing a bitter astringent taste in the biscuit. Results of baking at a neutralizing value of 90 showed the baked biscuits to have a specific volume of 2.6, a pH value of 7.4, and a fine open grain structure. Excellent results were also obtained with the above new type baking acids in baking cakes and doughnuts.

Baking powder compositions and self-rising flour compositions including the new complex alkali metal-aluminum or iron acid phosphates are claimed in my copending application, Serial No. 793,531, filed December 23, 1947, with this application being a continuation-in-part of the present application.

The term alkali metal atom as used in the claims includes the ammonium group.

The foregoing detailed description has been given for clearness of understanding only, and no unnecessary limitations should be understood therefrom.

What I claim as new, and desire to secure by Letters Patent, is:

1. A crystalline compound having the formula $$MM'_3H_{14}(PO_4)_8 \cdot 4H_2O$$

wherein M is a member of the class consisting of sodium, potassium and ammonium and M' is a trivalent metal atom of the class consisting of aluminum and iron.

2. A compound as set forth in claim 1 in which M' is aluminum.

3. Sodium aluminum acid phosphate of the formula:

$$NaAl_3H_{14}(PO_4)_8 \cdot 4H_2O$$

4. Ammonium aluminum acid phosphate of the formula:

$$(NH_4)Al_3H_{14}(PO_4)_8 \cdot 4H_2O$$

5. Potassium aluminum acid phosphate of the formula:

$$KAl_3H_{14}(PO_4)_8 \cdot 4H_2O$$

6. The method for producing a complex compound of the formula $MM'_3H_{14}(PO_4)_8 \cdot 4H_2O$ wherein M is a member of the class consisting of sodium, potassium and ammonium and M' is a trivalent metal atom of the class consisting of aluminum and iron, which comprises adding a member of the class consisting of sodium, potassium and ammonium compounds, and a material of the class consisting of iron, aluminum and basic ferric and aluminum compounds to a solution of phosphoric acid, the metal compounds being in stoichiometric proportions to provide M and M' in the ratio existing in said formula, and the phosphoric acid in said solution being in excess of that amount required to react with all of said metal compounds to form the compound of said formula, boiling the resulting solution to concentrate and cause crystallization of said complex compound and recovering said crystalline product.

7. A method as set forth in claim 6 in which the excess acid is removed from the crystals with methanol.

GUY A. McDONALD.

REFERENCES CITED

The following references are of record in the file of this patent:

UNITED STATES PATENTS

| Number | Name | Date |
|---|---|---|
| 1,113,632 | Holbrook | Oct. 13, 1914 |
| 1,234,858 | Balchlock | July 31, 1917 |
| 1,834,747 | Stokes | Dec. 1, 1931 |
| 1,926,266 | Darsey | Sept. 12, 1933 |
| 1,944,881 | Finkel | Jan. 30, 1934 |
| 2,160,701 | Knox | May 30, 1939 |
| 2,291,608 | Cobbs | Aug. 4, 1942 |
| 2,291,609 | Cobbs | Aug. 4, 1942 |
| 2,314,090 | Huff | Mar. 16, 1943 |
| 2,405,884 | Gregar | Aug. 13, 1946 |
| 2,408,258 | Hetzel | Sept. 24, 1946 |

FOREIGN PATENTS

| Number | Country | Date |
|---|---|---|
| 5,111 | Great Britain | of 1914 |

OTHER REFERENCES

Mellor: Comprehensive Treatise on Inorganic and Theoretical Chemistry, Longmans, Green & Co., N. Y., vol. 14 (1935), pages 409, 410; vol. 5 (1924), page 367.